Feb. 7, 1956     W. F. SURGI     2,733,661
MOBILE POWER UNIT

Filed March 12, 1953     3 Sheets-Sheet 1

INVENTOR,
William F. Surgi.
BY
E. E. Vrooman & Co.,
ATTORNEYS.

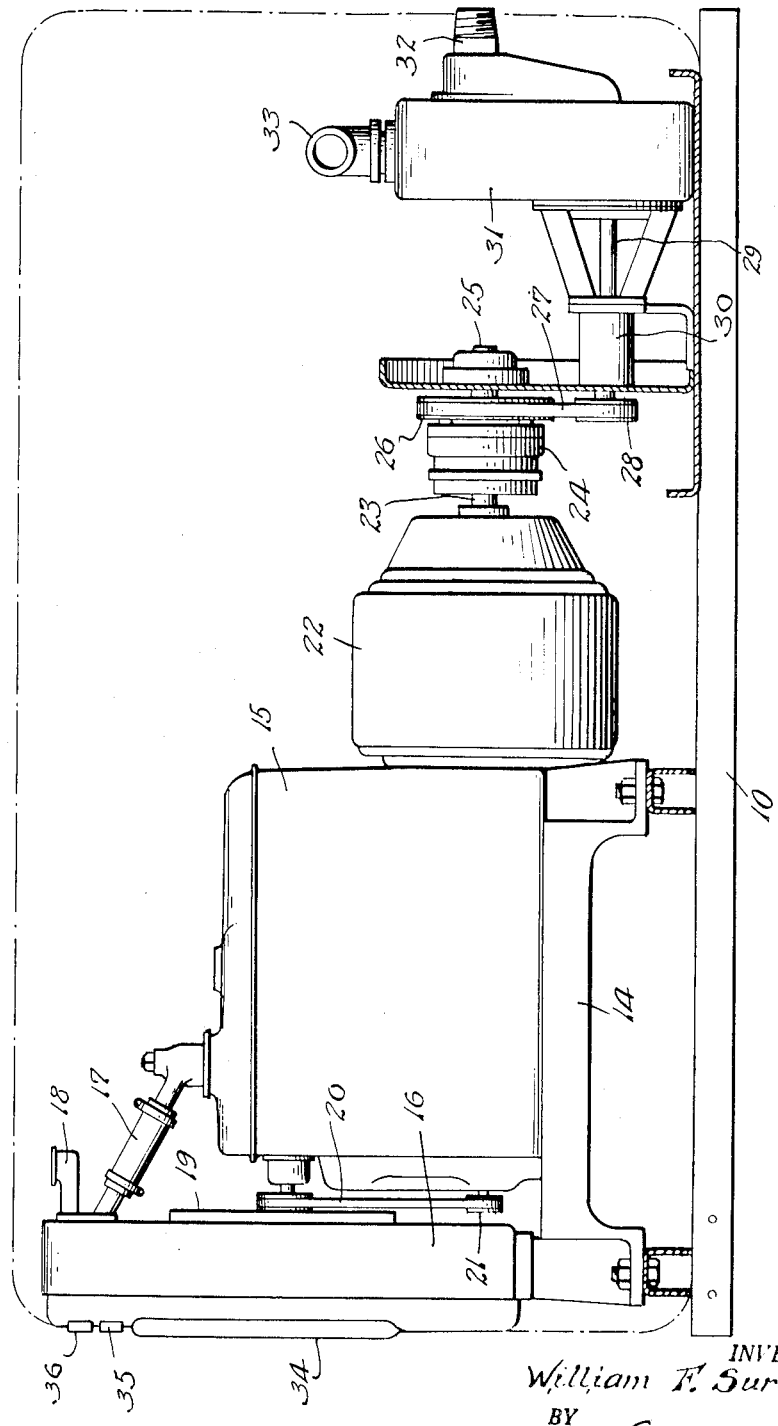

Feb. 7, 1956   W. F. SURGI   2,733,661
MOBILE POWER UNIT
Filed March 12, 1953   3 Sheets-Sheet 3
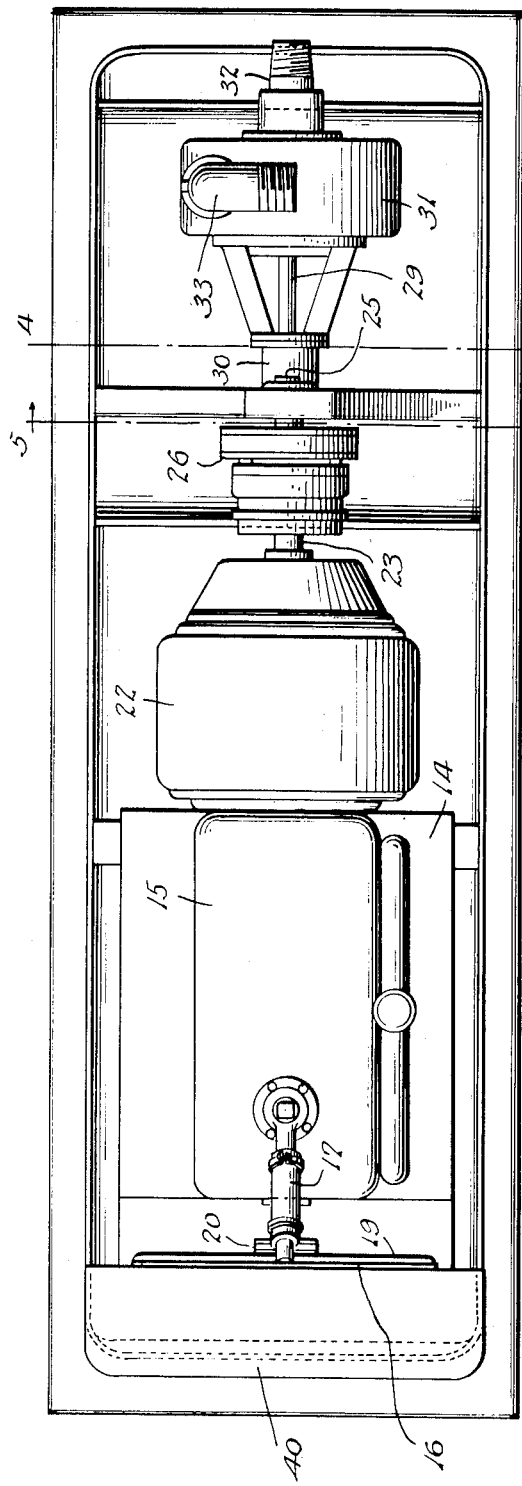
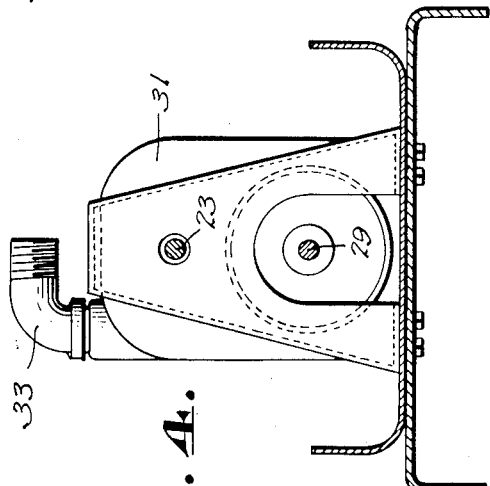
INVENTOR,
William F. Surgi,
BY
ATTORNEYS.

United States Patent Office 2,733,661
Patented Feb. 7, 1956

2,733,661

MOBILE POWER UNIT

William Francis Surgi, New Orleans, La.

Application March 12, 1953, Serial No. 342,004

1 Claim. (Cl. 103—23)

This invention relates to portable electric plants and has special reference to a trailer mounted electrical plant preferably termed a mobile power unit.

One important object of the invention is to provide a mobile power unit particularly designed to be used by telephone cable splicing crews for lighting, operating solder pots or solder irons and electric blowers for ventilating manholes.

An additional important object of the invention is the provision of a mobile power unit including an internal combustion engine, a generator, a pump, driving and driven shafts, belt and pulley connections between said shafts and clutch means for engaging and disengaging the belt and pulley connection, all compactly mounted in a small space on a single trailer unit.

Another object of the invention is to provide a device of this character wherein the several elements are lineally arranged so that the trailer width may be kept to a minimum.

A still further object of the invention is to provide a power unit of this class wherein arrangement is made for illuminating the working area around the unit.

Still another object of the invention is to provide a unit of this class having a warning light carried thereby in order to prevent possibility of vehicles accidentally colliding with the unit when the latter is parked.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and:

Fig. 2 is an enlarged view showing the operating portions of the unit in side elevation.

Fig. 3 is a plan view of the arrangement shown in Fig. 2.

Fig. 4 is a detailed view of one end of Fig 2.

Figure 1:
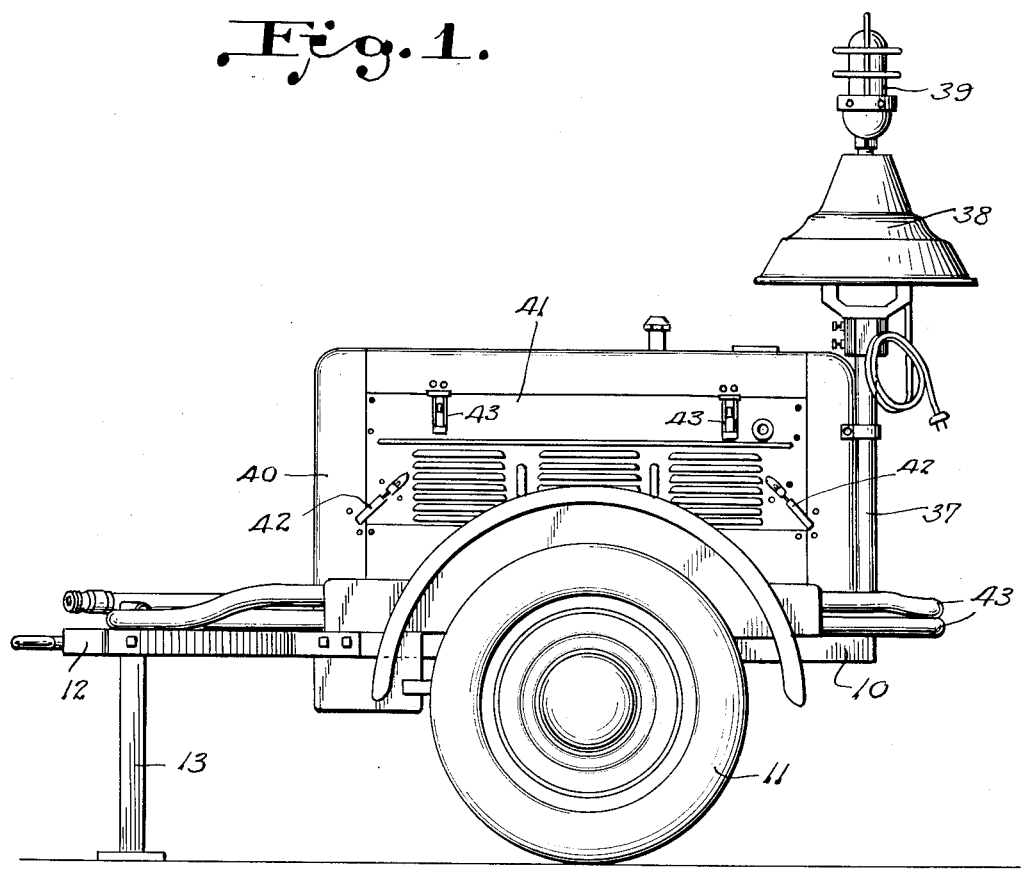
Fig. 1 is a side elevation of the improved mobile power units.
Figure 5:
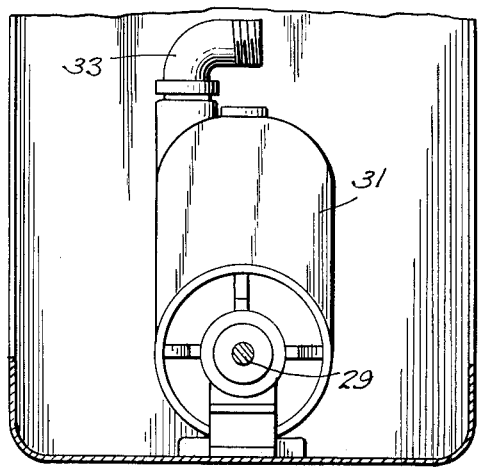
Fig. 5 is a detailed view on the line 5—5 of Fig. 3.

In the construction of the mobile unit there is provided a platform 10 supported on a pair of pneumatic tired wheels 11. Extending forwardly from this platform is a tongue 12 for attachment to the rear end of any suitable motor vehicle. Pivoted to this tongue 12 is a support 13 which may be positioned as shown in Fig. 1 or may be swung up to engage a suitable clip during the movement of the unit from one place to another, the clip not being deemed necessary here to be shown. Mounted on the platform 10 is an engine base 14 whereon is supported an internal combustion engine 15 hood or casing 15a. Forwardly of the engine 15 there is carried a radiator 16 to provide cooling water for the engine, the upper part of the radiator being connected to the engine block as shown at 17. Usual filling nozzle 18 is provided for this radiator. At 19 is a fan which is driven by a belt 20 from a pulley 21 mounted on the engine shaft.

At 22 is the usual generator casing containing the generator for generating the electrical output of this power unit. Extending rearwardly from the casing is a driven or tail shaft 23, which, through an electric clutch 24, drives a shaft 25. On this shaft 25 is mounted a belt pulley 26, which is connected by a belt 27 with a belt pulley 28 mounted on a shaft 29 suitably journalled in a bearing 30. This shaft 29 drives a self-priming centrifugal pump 31. This pump has an inlet nipple 32 and an outlet elbow 33; provided with each of these power units is a suitable length of suction hose and a suitable length of discharge hose, these being equipped with quick detachable couplings so that the hose may be removed from the pump without any special tools. Such hose is shown at 43. The pump 31 is for any pump use that may be required as for the supplying of water for use at a distance from the pump or the suction of water from a pit from which it is desirable to remove water.

On the unit there is provided a switchboard 34 having receptacles 35 for 110 volt circuits.

Other receptacles 36 are provided for 6 volt circuits to be used by the operators working underground. A 6 volt battery (not shown) is provided for the 6 volt circuit. At the rear end of the platform there is provided a telescopic mast 37 having a shade 38 at its upper end, the shade holding a high wattage lamp so that when the mast is raised the ground around the trailer will be well illuminated. Also, above the shade 38 is a blinker lamp 39 acting as a warning to prevent collisions by other vehicles. The main parts of the invention are normally covered by a housing 40 having doors 41 detachably secured by latches 42 and 43.

It is obvious that minor changes may be made in the form and construction of this invention without departing from the material principles thereof. It is not therefore desired to confine the invention to the exact form herein shown and described, but it is wished to include all such as properly come within the scope claimed.

I claim:

In a device of the kind described, a wheel supported platform and an engine base supported from said platform and spaced thereabove, an internal combustion engine mounted on said base, a generator including a casing on said internal casing engine and having a generator tail shaft extending rearwardly from the casing above the platform, a second shaft in alignment with said generator tail shaft, a pump supported on said platform and having a driving shaft extending forwardly beneath the first mentioned shaft, belt pulleys mounted on said second shaft and said driving shaft, a belt connecting said belt pulleys, an electric clutch connecting said generator tail shaft and said second shaft, said clutch being provided with a circuit connection to said generator, and a frame extending from the pump forwardly towards the generator and supporting said driving shaft.

References Cited in the file of this patent

UNITED STATES PATENTS

| | | |
|---|---|---|
| 821,673 | Richards | May 29, 1906 |
| 887,252 | Jackson | May 12, 1908 |
| 1,012,821 | Cutler | Dec. 26, 1911 |
| 1,048,702 | Johnston | Dec. 31, 1912 |
| 1,085,978 | Gibson | Feb. 3, 1914 |
| 1,492,800 | Jaeger | May 6, 1924 |
| 1,940,940 | Davey | Dec. 26, 1933 |
| 2,364,013 | Waseige | Nov. 28, 1944 |
| 2,375,121 | McClellan | May 1, 1945 |
| 2,600,643 | Hagelgantz | June 17, 1952 |
| 2,630,537 | Wiegman | Mar. 3, 1953 |
| 2,655,643 | Markle | Oct. 13, 1953 |